No. 696,600. Patented Apr. 1, 1902.
H. L. SILVER.
CAMERA.
(Application filed Oct. 28, 1901.)
(No Model.)
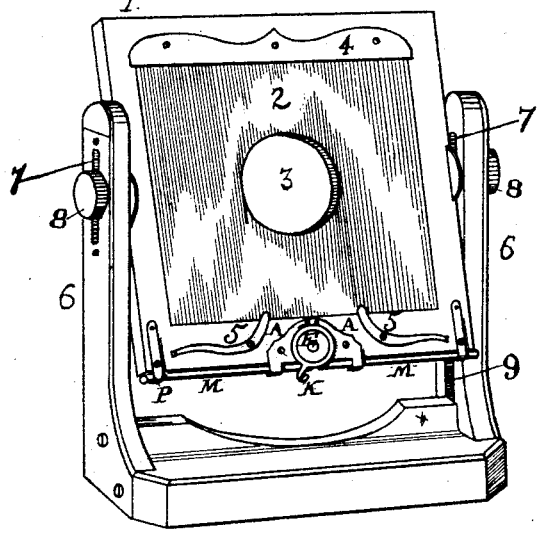
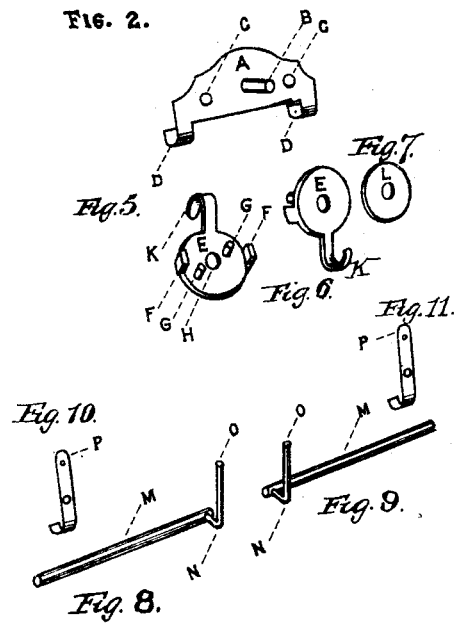
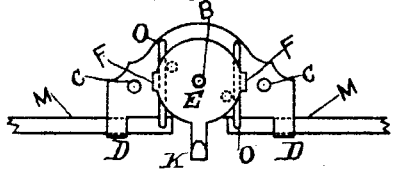
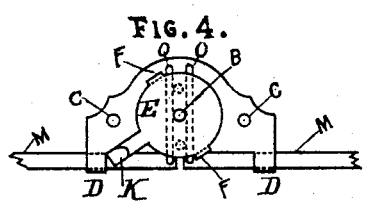
ATTEST:
Esther E Carrick
Joona Weber
INVENTOR:
H. L. Silver,
by Fenelon B. Brock
atty
THE NORRIS PETERS CO., PHOTO-LITHO., WASHINGTON, D. C.

UNITED STATES PATENT OFFICE.

HERMAN L. SILVER, OF LOS ANGELES, CALIFORNIA.

CAMERA.

SPECIFICATION forming part of Letters Patent No. 696,600, dated April 1, 1902.

Application filed October 28, 1901. Serial No. 80,299. (No model.)

*To all whom it may concern:*

Be it known that I, HERMAN L. SILVER, of the city of Los Angeles, county of Los Angeles, and State of California, have invented certain new and useful Improvements in Cameras; and I do hereby declare the following is a full and clear description thereof.

My invention relates to cameras.

The objects of the present improvements are to provide a camera-front with a combined linearly sliding and swinging front for the purpose of enlarging the field or zone of action and usefulness. Heretofore cameras have been provided with vertically-sliding fronts and horizontally-sliding fronts. Cameras have also been provided with vertically-swinging fronts. So far as I am aware, however, no camera-front has been provided with both a combined linearly-sliding adjustment and a swinging adjustment disposed for conjoint movement so that either or both may be brought into action.

For these purposes my invention consists in the following construction and combination of parts, the details of which will first be fully set forth and described, and the novel features thereinafter pointed out and claimed.

Figure 1 represents a perspective view of the front plate and supporting-guides of a camera to which I have applied my improvements. Fig. 2 is a perspective view of the cam-plate. Fig. 3 is a front elevation of the cam-plate, cams, and locking-bolts, the latter being broken away. Fig. 4 is a similar view showing the cam thrown for the purpose of withdrawing the bolts. Fig. 5 is a perspective view of the rear of the double cam. Fig. 6 is a perspective front view of the same. Fig. 7 is a perspective view of a washer. Fig. 8 is a perspective view of one of the locking-bolts, and Fig. 9 is a similar view of the other locking-bolt. Fig. 10 is a perspective view of one of the bearings of the locking-bolts, and Fig. 11 is a similar view of the corresponding bearing of the opposite locking-bolt.

1 represents the front of any suitable camera. This front is generally mortised to receive the lens-carrying plate 2, having the lens-aperture 3 therein. Provision is generally made to provide for the removability of the plate 2, which is generally done by a projecting lip 4 and swinging latches 5, the camera-front 1 being rabbeted to receive the plate 2.

The camera-front, and consequently the plate 1, is supported by the camera base or stand through the intervention of vertical guide-posts 6, provided with upper slotted portions 7, through which guiding and locking bolts project, having adjustably-setting nuts or heads 8. In the lower portion of the guides 6 are lower vertical slots 9, into which the bolts M are adapted to enter and be withdrawn. The construction and operation of these bolts above referred to will now be described.

A represents a cam-plate provided with a projecting pin B, means, as C, for securing the plate to the camera-front 1, and bearings, as D, for the bolts M.

E is the double cam for actuating the bolts M. It is provided with a central bearing H, which engages the pin B. The cam is provided with projecting arms O. Two cam-pins or projections G are also formed on the cam E, the vertical projecting arms O of the bolts M being adapted to each rest between a pair of these projections F and G.

The upright arms O are offset from the bolts M by means of a right-angle short-arm connection N, securing the arms O to the bolts M. The inner ends of the bolts are carried by the bearings D, and the outer ends of the bolts by the bearing-straps P, the arrangement being such, preferably, that the bolts M lie centrally under and parallel with the lower edge of the plate 1.

By moving the cam E in one direction the bolts M are shot into the opposite grooves of the guides 6, and the camera-front is thereby maintained in a vertical position. By loosening the set-screws 8 the camera-front may be adjusted up and down vertically within any desired limits to secure such result as may be maintained thereby. By operating the cam to withdraw the bolts M from the slots 9 the camera-front 1 may be oscillated or swung upon the set-screws 9 as a center and such result obtained as may accrue therefrom. Furthermore, by operating the cam E and set-screws 8 a combined linearly sliding and oscillating adjustment of the camera-front may be obtained. For instance, the set-screws may hold the camera-front at any desired elevation and the angle of inclination of the camera-front thereafter adjustably determined and set.

It will be understood that the words "vertically" or "horizontally" wherever used are used in a relative sense. For example, the linear adjustment may be in a horizontal instead of a vertical line, if found desirable or suitable, and the oscillating movement combined therewith also moved through a horizontal adjustment. A somewhat similar result may be obtained by turning the camera upon its side in making exposures.

My invention is applicable to all kinds of cameras for which it may be found suitable. The advantage of the great rise and fall of the camera-front is obtained by the use of this camera, at the same time retaining the advantages of the ordinary rising and falling front. Objects too far above or below the camera-level to be accommodated by the ordinary adjustment may be photographed by means of my invention. This is done by tilting the camera and swinging the back and front exactly parallel with each other, thereby preventing distortion of the image on the plate. The arrangement also permits the camera-front to have a plain finish instead of usual rabbeted edges, resulting in minimized cost of equipment, as it will be seen that the bolts M act as guides and take the place of the usual rabbets. I am also enabled to do away with the unusually-long guide-posts now commonly used in cameras in order to give sufficient rise and fall to the camera-front, thereby making the camera more compact and capable of being easily transported.

It is highly desirable in cameras to provide a means for vertically or linearly adjusting the camera-front and for maintaining the precise linear direction during such adjustment. In order to secure this result, it is necessary that there should be a plurality of guiding devices upon each side of the camera-front to maintain the linear direction of the front during the adjustment.

What I claim as new, and desire to secure by Letters Patent, is—

1. In a camera, the combination of a pair of standards, a camera-front secured in said standards, means for linearly adjusting the lens and camera-front upon the standards, means for maintaining the linear direction during said adjustment and means for swinging the camera-front.

2. In a camera, the combination of standards, means for adjustably setting the lens and camera-front upon the standards in a linearly-vertical plane, means for maintaining the linear direction during said adjustment and means for swinging the front in a vertical plane.

3. In a camera, the combination of a pair of standards, a camera-front carried thereby, a plurality of pin-and-slot connections upon each side of the camera-front, means for linearly adjusting the lens and camera-front upon the standards, means for maintaining the linear direction during said adjustment and means for swinging the camera-front.

4. In a camera, the combination of a pair of standards, a camera-front carried thereby, a plurality of pin-and-slot connections upon each side of the camera-front for linearly adjusting the lens and camera-front upon the standards, means for maintaining the linear direction during the linear adjustment, means for swinging the camera-front, and latches carried by the camera-front adapted to engage and disengage the standards.

5. In a camera, the combination of a pair of standards, a camera-front carried thereby, a plurality of pin-and-slot connections upon each side of the camera-front for linearly and radially adjusting the same, latches engaging the standards and a cam device for operating the latches.

In testimony whereof I have affixed my signature in the presence of two witnesses.

HERMAN L. SILVER.

Witnesses:
R. M. ADAMS,
C. P. HOUGHTON.